May 19, 1931.  H. S. HOLMES  1,806,558
REAR AXLE HOUSING AND THE LIKE AND METHOD OF PRODUCING IT
Filed Nov. 10, 1928
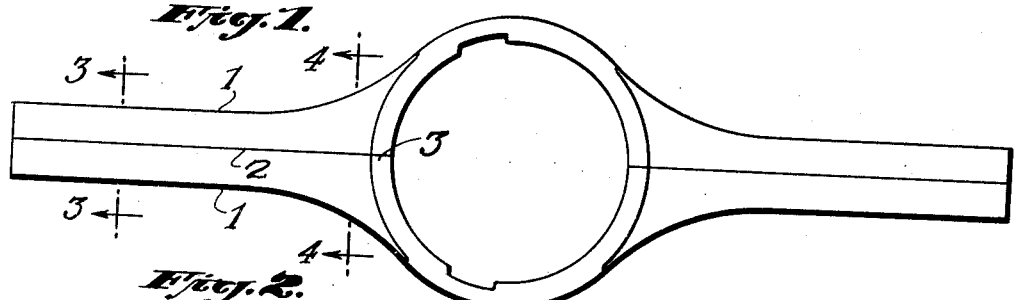
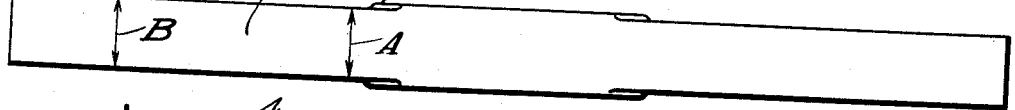
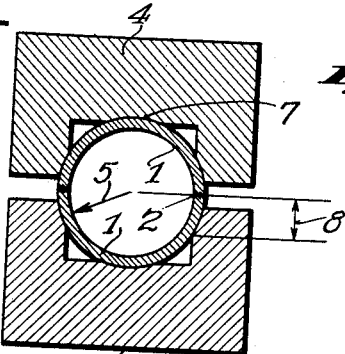
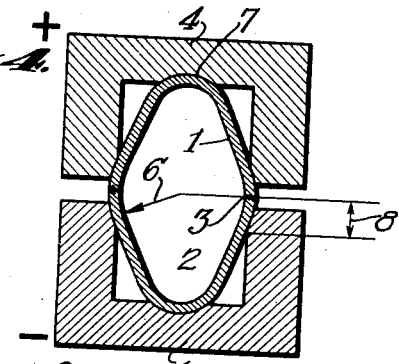
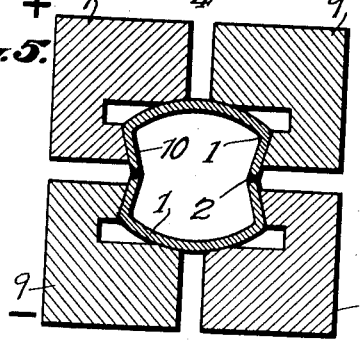
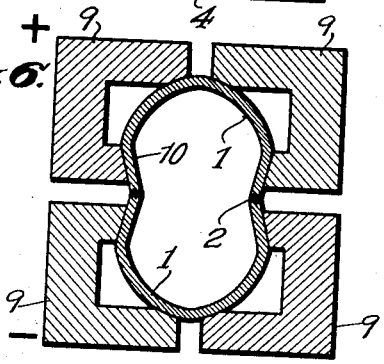
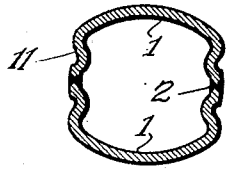
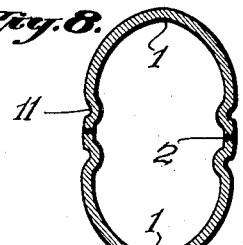
Inventor
HENRY S. HOLMES.
By his Attorney Patented May 19, 1931

1,806,558

UNITED STATES PATENT OFFICE

HENRY S. HOLMES, OF BROOKLYN, NEW YORK, ASSIGNOR, BY MESNE ASSIGNMENTS, TO METROPOLITAN ENGINEERING COMPANY, A CORPORATION OF NEW YORK

REAR AXLE HOUSING AND THE LIKE AND METHOD OF PRODUCING IT

Application filed November 10, 1928. Serial No. 318,337.

The invention applies to rear axle housings and similar tubular articles made of two longitudinal segments welded together along their edges. The principal object of the invention is to provide for certain economies in the production of such articles.

Fig. 1 is a side elevation and

Fig. 2 is a plan of a housing of the common "banjo" type.

Figs. 3 and 4 are sections on the correspondingly numbered lines of Fig. 1 illustrating the method of production.

Figs. 5 and 6 are views similar to Figs. 3 and 4 illustrating a modification.

Figs. 7 and 8 are similar views of another modification.

The housings are made of segmental stampings 1 welded together along lines 2. The product is usually of greater dimensions toward the centre than at the ends in the horizontal direction as well as the vertical. That is, it has been the general practice to make the dimension A in Fig. 2 greater than the dimension B. When the segments are welded by the arc or gas welding process the horizontal enlargement toward the centre presents no difficulties. But when they are welded by electrical butt-welding methods such as the Murray process (Reissue Patent No. 15,466, October 10, 1922) or the flash welding process certain difficulties are encountered which I propose to eliminate by the present invention.

I propose to make the cross section adjacent to the line of weld identical throughout substantially the length of the casing. That is to say, I would make the segments uniform throughout the length of a zone about three quarters of an inch from the edges which are welded. The width at A would therefore be the same as the width at B and this would be continued throughout the length; with the exception of a short distance at 3 where there must be a flat surface for attachment of the differential carrier and cover plate. This maintenance of a uniform width effects a saving in removing the burr formed on the inside of the joint when the Murray or the flash welding method is used. Such a burr can be removed with a single operation of a broach; whereas considerable hand chipping is necessary to remove the burr in housings which widen towards the centre.

There is also considerable economy in the shaping of the copper clamping dies which are used in the welding operation. These dies have to be replaced or reshaped after a certain number of welds. The shape of the housing as usually tapered both in height and width requires considerable expense for hand shaping the dies to fit the stampings. It is not necessary for the dies to fit the segments throughout their entire surface, but only to make good contact for a certain area adjacent to the edges, and to bear on the top and bottom. See Murray Patent No. 1,399,307, granted December 6th, 1921. This fact permits of simplifying the machining operations where the section of the housing is made uniform along the edges to be welded.

Figs. 3 and 4 illustrate this. The electrodes 4 bear against the sides of the segments near the edges, and also on the top and bottom. The radius 5 in Fig. 3 is the same as the radius 6 in Fig. 4. The only variation in shape of the electrodes therefore is a sloping of the bearing faces 7 at the top and bottom, tapering these faces longitudinally to fit the varying vertical section of the work. The length of the arc 8 is the same all along the work and is made adequate to carry the welding current, about three quarters of an inch in the welding of the average housing by the Murray method.

In flash welding each segment must be clamped transversely against the work so as to grip the segments during the weld while producing the arc or flash. To facilitate proper engagement by the electrodes, I provide an additional departure from the usual shape by pressing the sides of the segments inward. The electrodes will then be locked in engagement with the segments so that they may separate the latter as well as press them together. See Figs. 5 and 6. Each of the electrodes 9 in this case is made in two halves which are pressed together from opposite sides to clamp the segment, and each segment has a portion 10 at its edge which is bent inward and locked in engagement with the undercut edges of the electrodes. These edge portions are uniform throughout substantially the length of the product. Therefore the only variation in the bearing faces is that which is required by the variation in height of the segments from end to end.

Figs. 7 and 8 illustrate a variation in the shape of the edges of the segments. They are crimped to form grooves 11 for locking engagement with similarly shaped split electrodes. The crimped portions are uniform throughout their length, and the only variation in the bearing faces of the electrodes is that which is required by the varying vertical dimension of the segments.

The feature of shaping the segments to provide a locking engagement with the electrodes, by which they may be separated as well as pressed together by the movement of the electrodes as illustrated in Figs. 5 to 8, may be used with advantage even where the horizontal dimension is not uniform throughout the length.

The housings or other tubular products made with the slight deformation necessary for locking with the electrodes may be complete articles of manufacture usable in that shape, or they may be pressed out to the shape of Figs. 1 to 4 in various ways; for example, by the same tool which broaches out the welding burr on the inside of the housing. The shape of the tubes beyond the central annulus in Figs. 1 to 4 may also be subsequently reformed. But ordinarily such an operation will be rendered unnecessary by providing a uniform width which is equal to the maximum width required.

Other tubular products may be made economically by the methods described, using segments of uniform width across the edges and varying in the vertical dimension; and being reformed or not afterwards according to the uses to be made of them.

Various other modifications may be made by those skilled in the art without departure from the invention as defined in the following claims.

What I claim is:

1. The method of forming articles by the flash welding process which consists in providing segments with lateral indentations, locking them in welding electrodes by means of said indentations, moving the opposed electrodes with the segments so as to establish and maintain an arc between the welding edges, pressing the edges together to make the weld and, after welding, reshaping the product to remove the locking configurations.

2. A segment for the production of a rear axle housing, the end portions of said segment having parallel straight edges and having portions adjacent to such straight edges transversely curved on a radius which is uniform throughout the length of such straight edges.

3. A segment for the production of a rear axle housing, the end portions of said segment having parallel straight edges and being of a depth which varies along their length and having portions adjacent to such straight edges transversely curved on a radius which is uniform throughout the length of such straight edges.

4. In the flash welding of two segments to form a tubular article, the method which consists in shaping the segments to interlock with electrodes, clamping electrodes into engagement with said segments, passing a current and moving the opposed electrodes with the engaged segments to positions to establish and maintain an arc between the edges, stopping the welding current and pressing the heated edges of the segments together so as to make a weld.

5. The method of forming articles by the flash welding process which consists in providing segments with lateral indentations, locking them in welding electrodes by means of said indentations, moving the opposed electrodes with the segments so as to establish and maintain an arc between the welding edges, and pressing the edges together to make the weld.

6. In the flash welding of two edges to form a tubular article, the method which consists in shaping the work adjacent to such edges to interlock with the electrodes, locking electrodes into engagement with said portions of the work, moving the opposed electrodes with the work so as to establish and maintain an arc between the welding edges and pressing the edges together to make the weld.

7. A segment for the production of hollow articles, the sides of the segment having indentations forming transversely extending external faces whereby they may be locked in engagement with a welding electrode.

In witness whereof, I have hereunto signed my name.

HENRY S. HOLMES.